Dec. 9, 1952                J. RILEY               2,620,599

GEAR GRINDING MACHINE

Filed March 29, 1950                                 3 Sheets-Sheet 1

INVENTOR: JOSEPH RILEY.
By: Harness Dickey & Pierce.
Attorneys.

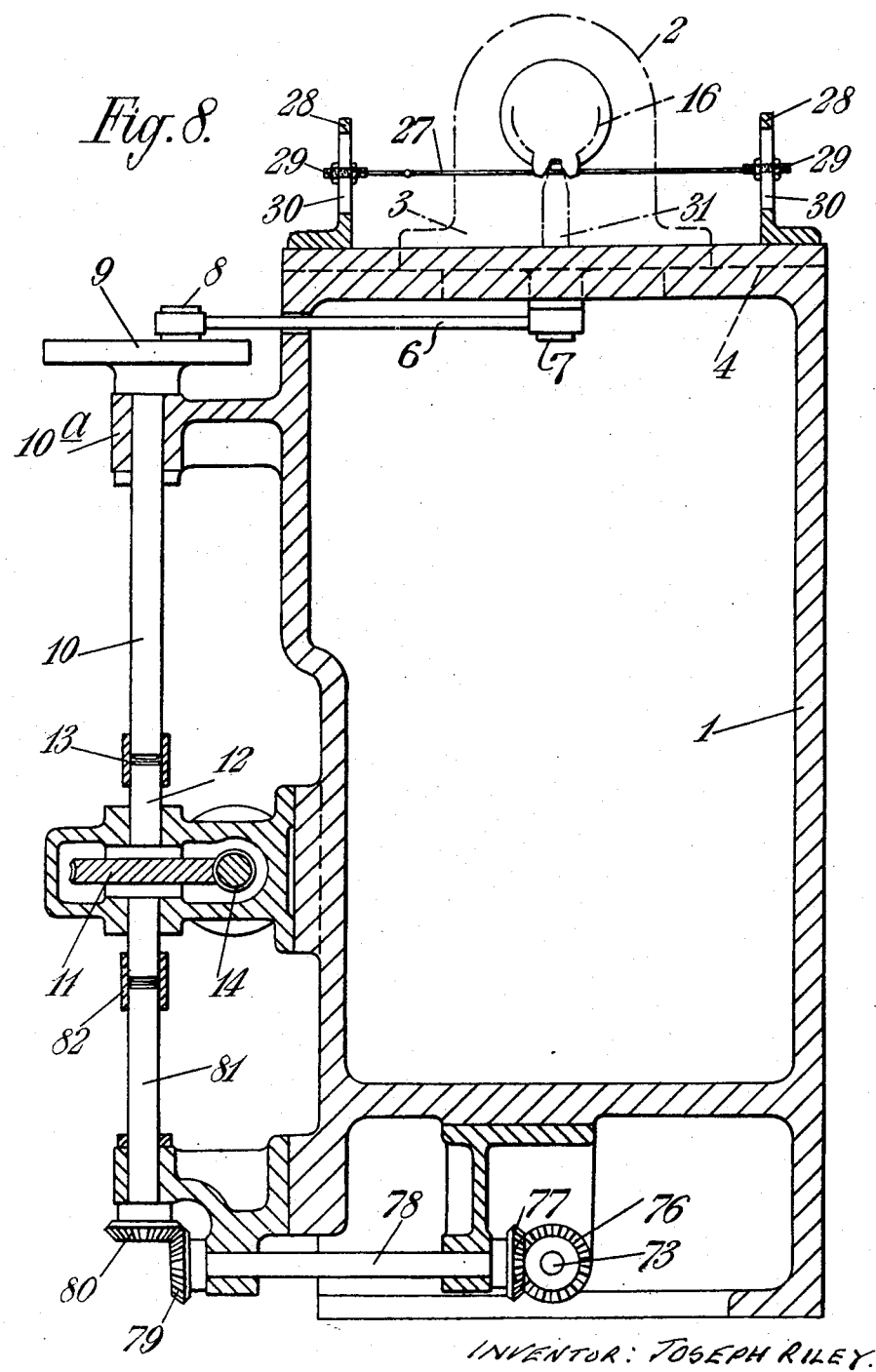

Patented Dec. 9, 1952

2,620,599

UNITED STATES PATENT OFFICE 2,620,599

GEAR GRINDING MACHINE

Joseph Riley, Staines, England, assignor to
W. E. Sykes Limited, Staines, England Application March 29, 1950, Serial No. 152,580
In Great Britain April 7, 1949

8 Claims. (Cl. 51—56)

This invention relates to machines for grinding spur or helical gear tooth profiles by a generating method, of the kind in which the work and a grinding wheel of disc or similar form are reciprocated relatively in the general direction of the plane of the wheel to grind a tooth flank or flanks, the work being moved with a rolling motion by indexing or dividing means transversely to the direction of the aforesaid relative reciprocation, and the grinding wheel having a profile corresponding to that of the basic rack tooth of the tooth profile being ground. For grinding spur teeth, the direction of relative reciprocation is parallel to the axis of the work, and for helical teeth the direction of relative reciprocation is inclined to said axis. The profile of the grinding wheel may be such that it can grind one tooth flank only, or it can be formed to grind the flanks of two adjacent teeth simultaneously.

The object of the invention is to provide an improved machine of the above kind which is capable of grinding gears or gear shaper cutters which are of conical or non-cylindrical or tapered form. Another object is to provide a machine capable of grinding gears of conical form and particularly gear shaper cutters in a simple and economical manner.

The invention consists in providing means for effecting the required relative reciprocation between the work and the grinding wheel in a direction which is inclined to the axis of the work such that a conical or similar gear or gear shaper cutter is produced.

The invention also consists in providing means for reciprocating the grinding wheel relative to the work in a direction which is inclined to the work axis such that a gear or gear shaper cutter of non-cylindrical and conical form is produced.

According to a further feature of the invention, means is provided for adjustably varying the inclination of the relative motion between the work and grinding wheel in or about the plane of the grinding wheel so that gears or cutters of different conical or like form can be produced. This may be effected for example, by mounting the grinding wheel on a reciprocating slide the inclination of which relative to the work axis can be adjusted in the plane of the wheel or a plane approximating thereto.

According to a further feature of the invention, means is provided for adjustably varying the inclination of the relative motion between the work and grinding wheel in or about the plane of the grinding wheel axis so that helical teeth can be produced. This may be effected for example by mounting the grinding wheel on a reciprocating slide which is itself carried by a circular slide which can be angularly adjusted about an axis which is transverse to the plane of the grinding wheel axis.

Any convenient or known means for indexing or dividing the work and for controlling its rolling motion may be employed, but preferably the controlling means comprise a steel tape or tapes co-operating with a drum on the work spindle, the work being carried in a head which is displaced transversely with respect to the work axis so that the required rolling motion is obtained.

In one convenient arrangement according to the invention, the work carrying spindle is supported horizontally in a head which is displaceable upon a slide in a direction transverse to the work axis, the rotation of the work spindle being controlled by a steel tape and drum arrangement of known kind to obtain the rolling motion required. The grinding wheel is carried upon a sliding head, the slideway of which is inclined with respect to the horizontal so that the teeth cut and the roots thereof will be of conical form.

It is also preferred to include means for adjusting the distance of the grinding wheel slide from the work axis for varying the depth of cut and also for periodically moving the grinding wheel slide away from the work axis to separate the wheel and work during the indexing or dividing displacement of the work gear.

In the accompanying drawings,

Figure 8 is a sectional end elevation of the machine taken on the line 8—8 of Figure 7.

Figure 1:
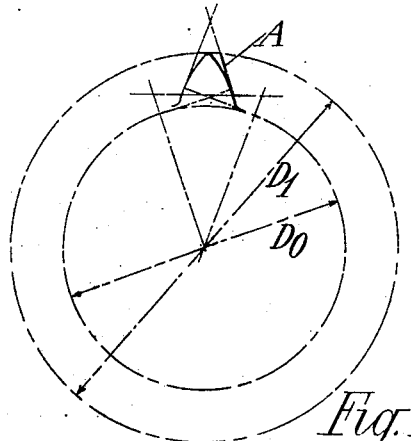
Figures 1, 2 and 3 are diagrammatic end elevations of three involute gears having the same tooth characteristics but of different outside diameters.
Figure 2:
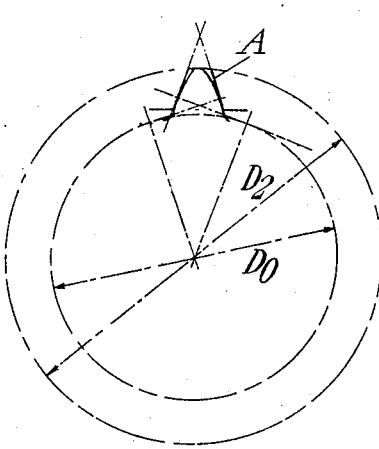
Figure 3:
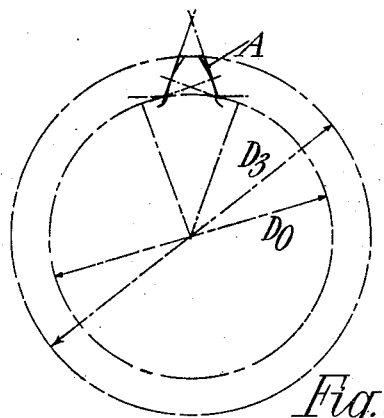
Figure 4:
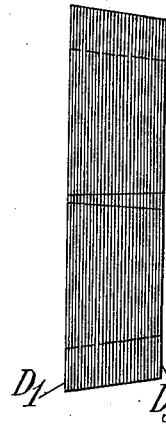
Figure 4 is a side view, more or less diagrammatic, of a laminated gear of conical form.
Figure 5:
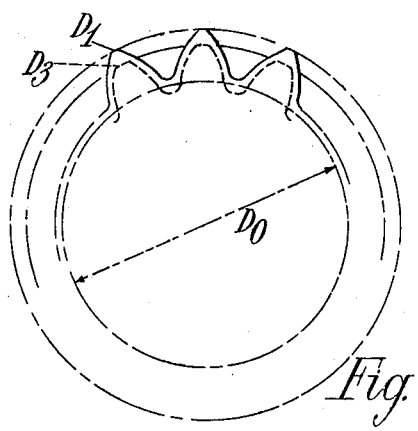
Figure 5 is an end view of such a gear.
Figure 6:
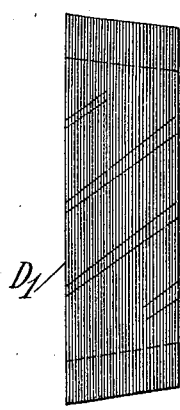
Figure 6 is a side view of a laminated gear similar to that of Figure 4, in which the laminations are relatively displaced angularly to form a helical gear.

It is known that involute gears having the same number of teeth, the same base circle diameter, and having a gear tooth form which can be enclosed in the same rack tooth form, can be generated to have different outside diameters. Examples of three such gears are shown in Figures 1, 2 and 3. The involute form of each gear is based on the same base circle $D_0$ and in each case the gear tooth is based on the same rack tooth form A. The outside diameter $D_1$ of the gear shown in Figure 1 is greater than the outside diameter $D_2$ of the gear shown in Figure 2, and the outside diameter $D_3$ of the gear shown in Figure 3 is less than $D_2$. If a number of gears are produced as thin laminae having their outside diameters varying progressively from $D_1$ to $D_3$ and these are assembled in their progression of diameters with the axes of symmetry of the gear teeth in line, a gear will be produced as shown diagrammatically in Figures 4 and 5 having an outside diameter of conical form, a constant cylindrical base circle diameter, and the same rack form equivalent at any diameter of the conical form. Also, if the axes of symmetry of the gear teeth of successive laminae are given an angular displacement, a helical gear of conical outside form will be produced as shown in Figure 6. Gears of this form have numerous uses, particularly for use as gear shaper cutters, and this invention is concerned with means for forming such gears or cutters by the generating principle.

Figure 7:
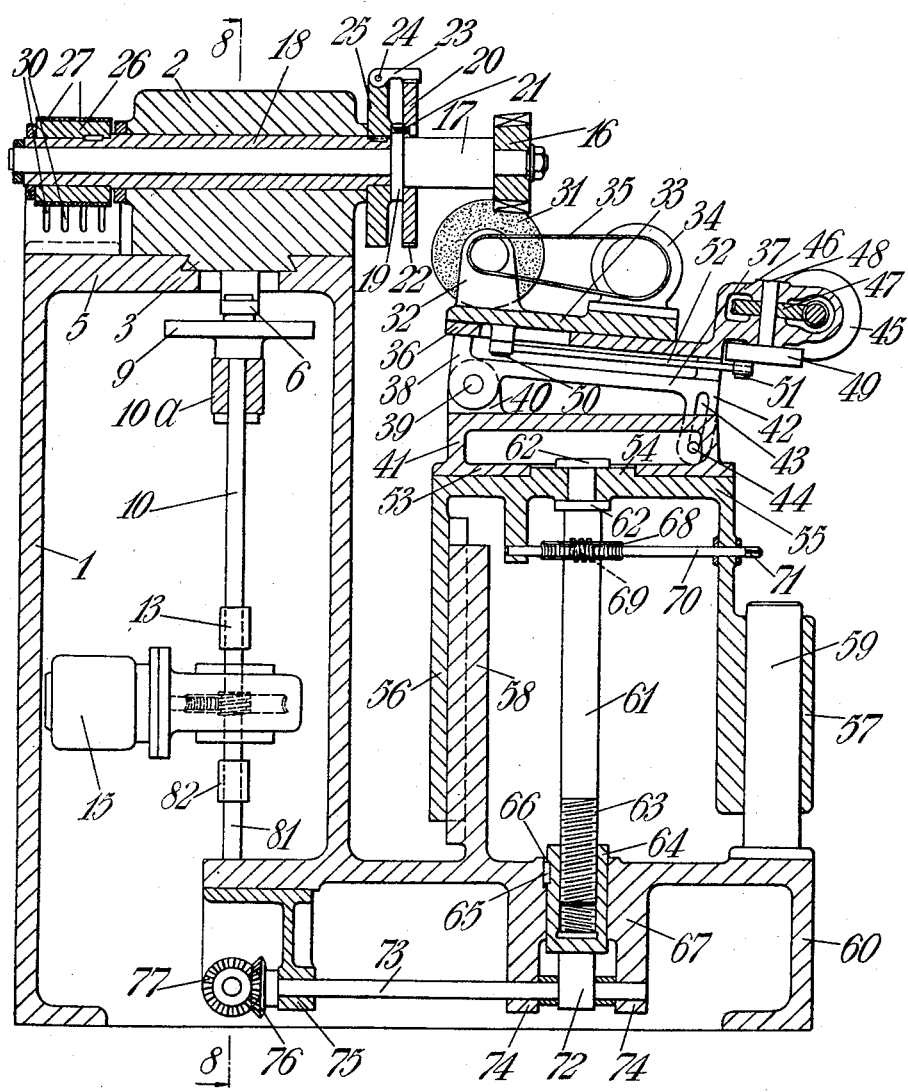
Figure 7 is a sectional side elevation of a machine constructed in accordance with the invention for grinding spur or helical gear tooth profiles.

The invention will be described as applied by way of example to a gear grinding machine of generally known kind and is illustrated in Figures 7 and 8. Such machines comprise a frame 1 upon which is mounted a head 2 formed with or carried by a cross slide 3 which can be reciprocated in a guide or slideway 4 in the top 5 of the frame 1. Any convenient means may be provided for reciprocating the slide 3 and in the present example these comprise a connecting rod 6 between a pin 7 on the slide and a pin 8 on a crank disc 9 secured to a vertical shaft 10. A worm wheel 11 is secured to a shaft 12 coupled at 13 to the shaft 10 and is driven by a worm 14 from an electric motor 15. The shaft is supported in a bracket 10a. Change speed gearing may be incorporated in the motor drive if desired, or the motor may be of the variable speed type. The work gear 16 to be formed is mounted on a spindle 17 journalled in a sleeve 18 which is itself journalled in the head 2. The spindle 17 has a collar 19 to which is secured a dividing or indexing plate 20 by means of a pin 21. The plate 20 is formed with peripheral notches 22 which can be engaged by a latch 23 pivoted at 24 on a disc 25 which is keyed to the sleeve 18. A drum 26 is keyed to the sleeve 18 and secured to the drum surface are flexible steel bands 27, the ends of which are anchored to brackets 28 secured to the frame top 5. The means for anchoring the bands comprise bolts and lock nuts 29 secured in vertical slots 30 formed in the brackets 28. It will be understood that as the slide 3 is reciprocated, the drum 26 will be constrained to roll on the bands 27, thereby giving to the work gear 16 a rolling motion as if the gear were rolling over a stationary rack. To advance the work for the generation of successive tooth spaces, the latch 23 is lifted and the plate 20 is revolved to engage the latch in the next notch, the number of notches in the plate being equal to the number of teeth to be formed in the work gear. It is to be understood that any convenient or known means may be provided for operating the dividing or indexing mechanism and such may be controlled by a counter if desired. Also other indexing arrangements may be employed.

According to the invention the grinding wheel 31, which in the present example is of trapezoidal section as indicated in Figure 8, is rotatably mounted in brackets 32 on a slide 33 and is driven from an electric motor 34, also mounted on the slide, by a belt 35. The slide 33 is slidable longitudinally, i. e. the general direction of the plane of the grinding wheel 31, in a slideway or guides 36 in a pivotally mounted slide support 37 which is arranged so that the engaging slide surfaces are inclined with respect to the axis of the work carrying spindle 17. The slide support has depending bearings 38 at one end seated upon a pin 39 which is supported in brackets 40 secured at one end of a table 41. The other end of the slide support has a depending arm or arms 42 formed with an arcuate slot 43 in which is engaged a bolt 44 whereby the arm or arms can be secured to the table 41 with the slide at any desired inclination. For reciprocating the slide 33, a motor 45 is mounted on an extension bracket 46 of the slide support 37 and drives a worm wheel 47 on the shaft 48 to which is secured a crank disc 49. A pin 50 on the slide 33 is connected to a pin 51 on the crank disc 49 by a connecting rod 52.

The table 41 which carries the grinding wheel assembly previously described is mounted to permit of angular adjustment about a vertical axis. For this purpose the table is formed with a bottom plate 53 having a central aperture and constituting a circular slide which is guided by a spigot 54 about which the slide is adjustably displaceable. The spigot 54 forms part of a table support 55 on which the circular slide 41 rests. This table support is vertically movable and is guided by slides 56 and 57 in fixed vertical guides 58 and 59 which are secured to the base structure 60, the latter being integral with the main frame 1. The table support 55 is maintained in position by a thrust shaft 61 having collars 62 which engage the table support, and the lower end of the shaft having a screw thread 63 which is engaged with the internal thread of a vertically movable nut member 64 having a key 65 slidable in a vertical keyway 66 in a housing 67, whereby rotation of the nut member 64 is prevented.

The thrust shaft 61 has secured to it a worm wheel 68 with which is meshed a worm 69 on a transverse spindle 70 carried in bearings in the table support 55 and having a squared projecting end 71 which can be rotated by means of a suitable key. By this means the thrust shaft can be rotated in the nut member 64 to move the table support 55 vertically and thereby the depth of cut of the grinding wheel 31 can be varied or adjusted as desired.

The vertically slidable nut member 64 rests upon and is supported by a cam 72 secured to a shaft 73 carried in bearings 74 forming part of the housing 67. The other end of shaft 73 is supported in a bearing 75 and has secured to it a bevel gear 76 meshing with a bevel gear 77 on a shaft 78 which also carries a bevel gear 79 meshing with a second bevel gear 80 on a vertical shaft 81 connected by a coupling 82 to the shaft 12 previously described. The arrangement is such that towards the end of the reciprocating motion of the slide 3 which carries the head 2 and work spindle 17, the rotation of the cam 72 causes the table support 55 and its slides 56 and 57 to be lowered, thereby lowering the grinding wheel 31 so that the latter is withdrawn a substantial distance from the work during the dividing or indexing operation which is effected by raising of the latch member 23 as previously described. When the motion of the slide 3 is reversed, the cam 72 again raises the grinding wheel to its former position ready for another generating operation as the head 2 performs a further stroke in the opposite direction.

The operation of the machine will be clear from the foregoing description of the various parts thereof. If the line of reciprocation of the grinding wheel were to be in the horizontal plane (the horizontal plane being that which contains the mating surfaces of the circular table 53 and the support 55), the work axis being in a plane parallel to said horizontal plane, then cylindrical gears either of straight or helical form could be produced, dependent on the setting of circular table 53 on the support 55. It will be seen that with the arrangement shown in the drawings, as the rotating grinding wheel is reciprocated on its slide 33, its axis at any part of the stroke will be at a greater or less distance from the axis of the work gear 16, according to the angle at which the slideway 36 is secured by adjustment of the slot 43 by means of the bolt 44. Conical or tapered gears or gear shaper cutters will thus be produced either of straight or helical form dependent on the setting of the circular table 53 on its support 55. The operation of the indexing or dividing means and the means for adjusting the depth of cut and for withdrawing the grinding wheel during the indexing displacements are well known and it is not thought to be necessary to describe these in detail.

It will be understood that the required relative motions for producing conical or like gears may be obtained in other ways. Thus, for example, the grinding wheel slide may be arranged so that the direction of its reciprocation is horizontal, as in the generally known machines, and the slideway of the cross slide carrying the work head may be formed as a pivotally mounted structure, the pivotal axis being horizontal and transverse to the work axis, the arrangement being such that the inclination of the work axis to the direction of reciprocation of the grinding wheel can be adjusted as desired to produce gears or gear shaper cutters of non-cylindrical and conical form. The pivotally mounted structure aforesaid also carries the frame to which the steel tapes for controlling the generating motion of the work are anchored.

By this invention, involute gears of conical, tapered and like forms can be ground in a simple and economical manner, and the invention is applicable with particular advantage to the production of gear shaper cutters. The invention is not restricted, however, to the example described, since the required relative motions of the work and grinding wheel can be effected in many ways. Thus for example the work can be reciprocated with respect to the grinding wheel, and the reciprocations can be effected by other than mechanical means, for example by hydraulic mechanism. Also whilst the invention has been described as applied to a machine having a grinding wheel of trapezoidal form which grinds opposite tooth flanks simultaneously, it is equally applicable to machines having grinding wheels of disc or like form which are adapted to grind one flank only of a tooth form during a single generating cycle.

I claim:

1. Apparatus for grinding gear-like elements comprising a supporting base frame, a work supporting head, a work supporting spindle rotatably mounted in said work supporting head, said work supporting head being slideably mounted for reciprocating movement on said base frame in a direction perpendicular to the axis of rotation of said spindle, a grinding head mounted on said base frame adjacent one end of said work supporting spindle, means for rotatably adjusting said head about an axis perpendicular to the axis of said spindle, said grinding head including upper and lower portions, said upper portion being pivotally connected to said lower portion, locking means for anchoring said portions in predetermined angular position with respect to each other, a grinding assembly carried by said upper portion of said grinding head, said grinding assembly being reciprocably mounted thereon, said grinding assembly including a grinding wheel and supporting spindle and means for driving said spindle.

2. Apparatus for grinding gear-like elements comprising a supporting base frame, a work supporting head, a work supporting spindle rotatably mounted in said work supporting head, said work supporting head being slideably mounted for reciprocating movement on said base frame in a direction perpendicular to the axis of rotation of said spindle, a drum-like element coaxially arranged with respect to, and anchored to said spindle, metallic tapes anchored to said drum, surrounding the same, and each having one end thereof anchored to said base frame whereby reciprocation of said work supporting head will effect rotation of said spindle, a grinding head mounted on said base frame adjacent one end of said work supporting spindle, means for rotatably adjusting said head about an axis perpendicular to the axis of said spindle, said grinding head including upper and lower portions, said upper portion being pivotally connected to said lower portion, locking means for anchoring said portions in predetermined angular position with respect to each other, a grinding assembly carried by said upper portion of said grinding head, said grinding assembly being reciprocably mounted thereon, said grinding assembly including a grinding wheel and supporting spindle and means for driving said spindle.

3. Apparatus for grinding gear-like elements comprising a supporting base frame, a work supporting head, a work supporting spindle journalled for rotation in said head, ways interconnecting said head with said base frame and providing means for reciprocating said head with respect to said base frame in a direction perpendicular to the axis of rotation of said spindle, means for locking a gear-like element to be ground on said spindle, index means for precisely adjusting the position of a gear to be ground with respect to said spindle, a grinding head mounted on said base frame adjacent one end of said work supporting spindle, means for rotatably adjusting said head about an axis perpendicular to the axis of said spindle, said grinding head including upper and lower portions, said upper portion being pivotally connected to said lower portion, locking means for anchoring said portions in predetermined angular position with respect to each other, a grinding assembly carried by said upper portion of said grinding head said grinding assembly being reciprocably mounted thereon, said grinding assembly including a grinding wheel and supporting spindle and means for driving said spindle.

4. Apparatus for grinding gear-like elements comprising a supporting base frame, a work supporting head, a work supporting spindle journalled for rotation in said head, ways interconnecting said head with said base frame and providing means for reciprocating said head with respect to said base frame in a direction perpendicular to the axis of rotation of said spindle, means for locking a gear-like element to be ground on said spindle, index means for precisely adjusting the position of a gear to be ground with respect to said spindle, a drum-like element coaxially arranged with respect to and anchored to said spindle, metallic tapes anchored to and surrounding said drum and each having one end thereof anchored to said base frame whereby reciprocating movement of said head will effect rotation of said spindle precisely in accordance with the magnitude of said reciprocating movement, a grinding head mounted on said base frame adjacent one end of said work supporting spindle, means for rotatably adjusting said head about an axis perpendicular to the axis of said spindle, said grinding head including upper and lower portions, said upper portion being pivotally connected to said lower portion, locking means for anchoring said portions in predetermined angular position with respect to each other, a grinding assembly carried by said upper portion of said grinding head, said grinding assembly being reciprocably mounted thereon, said grinding assembly including a grinding wheel and supporting spindle and means for driving said spindle.

5. Apparatus for grinding gear-like elements comprising a supporting base frame, a work supporting head, a work supporting spindle rotatably mounted in said work supporting head, said work supporting head being slideably mounted for reciprocating movement on said base frame in a direction perpendicular to the axis of rotation of said spindle, a grinding head mounted on said base frame adjacent one end of said work supporting spindle, said grinding head comprising a lower portion, an upper portion and a grinding assembly carried by said upper portion, said grinding head as a whole being rotatably mounted on said base frame for adjustable rotation about an axis perpendicular to the axis of rotation of said work supporting spindle, means for locking said grinding head in predetermined adjusted position, the upper and lower portions of said grinding head being pivotally connected together and means for locking said upper and lower portions in predetermined angular adjustment with respect to each other, said grinding assembly comprising a grinding wheel and means for rotatably driving the same.

6. Apparatus for grinding gear-like elements comprising a supporting base frame, a work supporting head, a work supporting spindle rotatably mounted in said work supporting head, said work supporting head being slideably mounted for reciprocating movement on said base frame in a direction perpendicular to the axis of rotation of said spindle, a grinding head mounted on said base frame adjacent one end of said work supporting spindle, said grinding head comprising a lower portion, an upper portion and a grinding assembly carried by said upper portion, said grinding head as a whole being rotatably mounted on said base frame for adjustable rotation about an axis perpendicular to the axis of rotation of said work supporting spindle, means for locking said grinding head in predetermined adjusted position, the upper and lower portions of said grinding head being pivotally connected together and means for locking said upper and lower portions in predetermined angular adjustment with respect to each other, said grinding assembly including in combination, a base member reciprocably mounted on the upper portion of said grinding head, means for automatically effecting reciprocation of said base member with respect to said upper portion, a grinding wheel spindle support carried by said base member, a spindle journalled in said support, a grinding wheel carried by said spindle, and means on said base member for rotatably driving said grinding wheel and spindle.

7. In a machine for grinding gear-like elements, a supporting base, a grinding head assembly mounted on said supporting base and rotatable about a substantially vertical axis, means for locking said grinding head assembly in predetermined adjusted position about said axis, said grinding head comprising a lower portion, an upper portion, and a grinding assembly carried by said upper portion, said upper and lower portions being pivotally connected about a transverse axis, means for locking said upper and lower portions in predetermined pivotal position with respect to each other, said grinding assembly carried by said upper portion comprising a base member reciprocably mounted with respect to said upper portion, a spindle support carried by said base member, a spindle journalled in said support, a grinding wheel carried by said spindle in a plane substantially parallel to the direction of reciprocation of said base, and means mounted on said base portion for driving said spindle and grinding wheel.

8. In a machine for grinding gear-like elements, a supporting base, a grinding head assembly mounted on said supporting base and rotatable about a substantially vertical axis, means for locking said grinding head assembly in predetermined adjusted position about said axis, said grinding head comprising a lower portion, an upper portion, and a grinding assembly carried by said upper portion, said upper and lower portions being pivotally connected about a transverse axis, means for locking said upper and lower portions in predetermined pivotal position with respect to each other, said grinding assembly carried by said upper portion comprising a base member reciprocably mounted with respect to said upper portion, a spindle support carried by said base member, a spindle journalled in said support, a grinding wheel carried by said spindle, and means mounted on said base portion for driving said spindle and grinding wheel, crank means carried by the upper portion of said grinding head, said crank means engaging the base of said grinding assembly whereby to effect reciprocation thereof with respect to said upper portion, and motor means for driving said crank means.

JOSEPH RILEY.

REFERENCES CITED

The following references are of record in the file of this patent:

UNITED STATES PATENTS

| Number | Name | Date |
|---|---|---|
| 1,351,580 | Maag et al. | Aug. 31, 1920 |
| 1,551,167 | Orlow | Aug. 25, 1925 |
| 2,187,062 | Sykes | Jan. 16, 1940 |
| 2,207,018 | Linse et al. | July 9, 1940 |
| 2,364,542 | Miller | Dec. 5, 1944 |